F. E. THEILACKER

July 12, 1932. COMPOSITION SHINGLE Re. 18,515

Original Filed Sept. 17, 1926

INVENTOR:
Frederick E. Theilacker
By E. J. Andrews
Att'y.

Reissued July 12, 1932 Re. 18,515

UNITED STATES PATENT OFFICE

FREDERICK E. THEILACKER, OF MILWAUKEE, WISCONSIN, ASSIGNOR, BY MESNE ASSIGNMENTS, TO NORMAN P. HARSHBERGER, OF SCARSDALE, NEW YORK

COMPOSITION SHINGLE

Original No. 1,710,954, dated April 30, 1929, Serial No. 136,081, filed September 17, 1926. Application for reissue filed April 3, 1931. Serial No. 527,563.

This invention relates to composition shingles and has for its object providing shingles so that they can be cut from sheets without waste and formed so that they can be laid in interlocked rows and with the lap portion of each shingle of any row interlocking with the underlying rows of shingles. In this manner the shingles are not only held firmly together in the rows, but the lap portions are prevented from turning upwardly by the action of the wind, sun, or otherwise. A further object of the invention is to shape the shingles so that, when assembled, they will present a pleasing appearance. Other objects of the invention will be apparent from a consideration of the accompanying drawing and the following description thereof.

Figure 1:
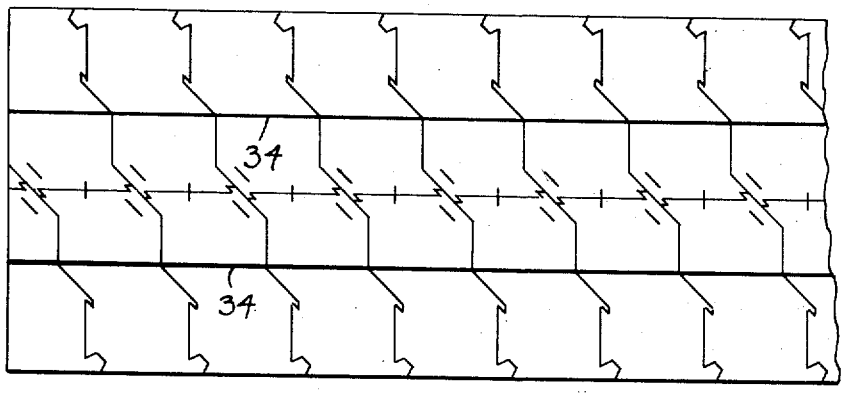
Figure 2:
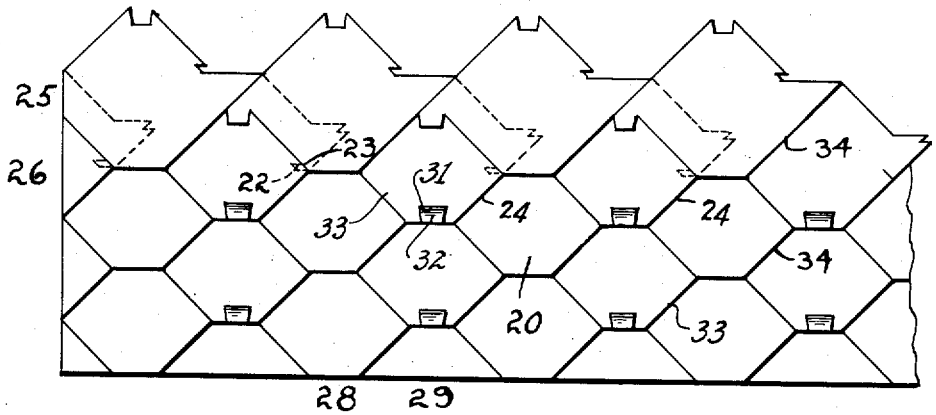
Figure 3:
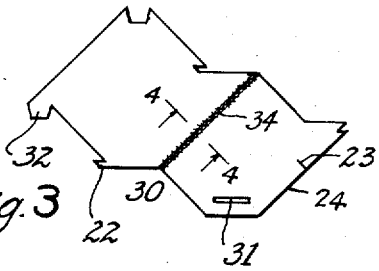
Figure 4:
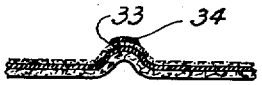

Of the drawing Fig. 1 is a plan view of a sheet of shingle material showing how shingles which embody my invention may be cut from the sheet; Fig. 2 is a plan view of the shingles, slightly enlarged, as they appear when laid on the roof; Fig. 3 is a plan view of a single shingle of this type; Fig. 4 is an enlarged sectional view along the lines 4—4 of Fig. 3.

The shingle 30 of Figs. 1, 2 and 3 is of the general shape of a parallelogram. The sides of the shingle are more or less zig-zag shaped so as to form a hexagonal figure 20 when the shingles are assembled. It will be obvious that by slight modifications in the shape of the shingles these figures may be equiangular or equilateral, or both. The figure, however, is arrived at by forming a stripe 34 across the central portion of the shingle, as, in this case, the shingles are strip shingles comprised of what is equivalent to two individual shingles. As a consequence, there is no edge in this central portion and to give the hexagonal effect the black stripe 34 is provided. Each of the shingles has a lug 22 on one side and a slit 23 on one end, the lug of one shingle being adapted to interlock with the slit 23 in the edge 24 of an adjacent shingle, in the same horizontal row, so that the two shingles are more or less locked together, and at the same time the position of the shingles with reference to each other is determined. By so interlocking the shingles a row 25 is formed which ordinarily runs horizontally and which laps on an underlying row 26 of similarly interlocked shingles. Each of the shingles also has a lug 32 and a slit 31 and when assembled the lug 32 of a shingle in one row is passed upwardly through the slit 31 of an adjacent shingle in the overlying row. In this instance the shingles are laid in longitudinal rows 25 and 26, and also in transverse rows 28 and 29.

The manner of cutting these shingles without waste is clearly indicated by Fig. 1. A zig-zag line is cut longitudinally across the central portion of the strip of shingle material, and also a series of zig-zag lines are cut transversely of the sheet, the shape of these lines being such as to provide the desired shape of the shingles and also to provide suitable interlocking means. The angles formed in the transverse lines are approximately 120° so as to form angles of hexagonal figures, and the various straight portions of the lines are substantially equal. At certain corners the lugs 22 and 32 are formed as indicated.

As stated, these shingles, being strip shingles, comprise two individual shingles, and it becomes desirable to indicate a central line so as to complete the configuration of the design. In this instance, I prefer to form ridges 33 across the shingles. These ridges are formed by forming a ridge 33 therein as indicated in Fig. 4, and on top of the ridge a strip of asphalt 34 is placed, thus forming a black stripe along the top of the ridge. In this manner a very clear line of demarcation is made along the central portion of the shingle. These ridges and stripes are preferably formed in the sheets of shingle material before they are cut.

I claim as my invention:

1. A shingle having the shape in general of a parallelogram but with one pair of opposite edges comprising sets of substantially equal straight portions angularly inclined to each other, a lug projecting outwardly from one corner of said shingle, and an interior slot in another corner of said shingle, the said lug of one shingle being adapted to interlock with the slot of a similar shingle when said shingles are assembled.

2. A shingle as claimed in claim 1 and having a second lug projecting from the edge of the shingle between said first lug and said slot and adapted to be slipped under the edge of a third shingle when said shingles are assembled.

3. A shingle as claimed in claim 1 and having a second lug projecting therefrom between said first lug and said slot, and having a slit projecting inwardly from the end adjacent to said slot, said second lug being adapted to interlock with the slit of a third shingle when said shingles are assembled.

4. A shingle having the shape in general of a parallelogram, a lug projecting outwardly in the plane of the shingle from one corner of said shingle, and an interior slot in another corner of said shingle, the said lug of one shingle being adapted to interlock with the slot of a similar shingle when said shingles are assembled.

5. A shingle as claimed in claim 4 and having a second lug projecting therefrom between said first lug and said slot, and having a slit projecting inwardly from the end adjacent to said slot, said second lug being adapted to interlock with the slit of a third shingle when said shingles are assembled.

6. A composition shingle having the shape in general of a parallelogram, a lug normally lying in the plane of the shingle and positioned adjacent one corner of one of the sides of the parallelogram and having its free end pointing downwardly, said lug having an edge portion common with a side of the shingle, and an interior slot adjacent the other corner of said side, the said lug of one shingle being adapted to be flexed out of the plane of the shingle during assembly to engage in a downward direction with the slot of a similar shingle.

7. A composition shingle having the shape in general of a parallelogram, a lug normally lying in the plane of the shingle and positioned adjacent one corner of one of the lowermost sides of the parallelogram and having its free end pointing downwardly, said lug having an edge portion common with a side of the shingle, and an interior slot adjacent the other corner of said side, the said lug of one shingle being adapted to be flexed out of the plane of the shingle during assembly to engage in a downward direction with the slot of a similar shingle.

8. A composition shingle having the shape in general of a parallelogram, a lug normally lying in the plane of the shingle and positioned adjacent one side of the parallelogram and having its free end pointing downwardly, said lug having an edge portion common with a side of the shingle, and an interior slot adjacent said same side of the parrallelogram as the lug and spaced from the lug, the said lug of one shingle being adapted to be flexed out of the plane of the shingle during assembly to engage in a downward direction with the slot of a similar shingle.

9. A composition shingle having the shape in general of a parallelogram, a lug normally lying in the plane of the shingle and positioned adjacent one side of the parallelogram and having its free end pointing downwardly, said lug having an edge portion common with a side of the shingle, and an interior slot adjacent said same side of the parallelogram as the lug and spaced from the lug, the said lug of one shingle being adapted to be flexed out of the plane of the shingle during assembly to engage in a downward direction with the slot of a similar shingle in the same course.

10. A composition shingle having the shape in general of a parallelogram and adapted to be laid with its parallel edges extending diagonally, a lug in connection with one corner of one of said diagonal edges and projecting outwardly and downwardly beyond said edge, said lug having an edge portion common with a side of the shingle, and an interior slot formed adjacent the other corner of said edge, the said lug of one shingle being adapted to engage in a downward direction with the slot of an adjacent shingle when said shingles are assembled.

11. A composition shingle having the shape in general of a parallelogram and adapted to be laid with its parallel edges extending diagonally, a lug associated with one corner of one of said parallel diagonal edges and having its free end pointing downwardly, said lug having an edge portion common with a side of the shingle, and a receiving means formed adjacent the other corner of said edge, the lug of one shingle being adapted to engage in a downward direction with the receiving means of an adjacent shingle when said shingles are assembled.

12. A composition shingle having the shape in general of a parallelogram and adapted to be laid with its parallel edges extending diagonally, a lug associated with one corner of one of the lower parallel diagonal edges and having its free end pointing downwardly, said lug having an edge portion common with a side of the shingle, and a receiving means formed adjacent the other corner of said lower edge, the said lug of one shingle being adapted to engage in a downward direction with the receiving means of an adjacent shingle when said shingles are assembled.

13. A composition shingle having the shape in general of a parallelogram adapted to be laid with its parallel edges extending diagonally, a lug associated with one corner of one of said parallel diagonal edges and having its free end pointing downwardly, said lug having an edge portion common with a side of the shingle, and an interior slot formed adjacent the other corner of said edge, the said lug of one shingle being adapted to engage in a downward direction with the slot of an adjacent shingle when said shingles are assembled.

In testimony whereof, I affix my signature.

FREDERICK E. THEILACKER.